J. WALSH.
Harrow.

No. 67,387. Patented July 30, 1867.

Witnesses:
E. Thurber
N. P. Baker

Inventor:
James Walsh

United States Patent Office.

JAMES WALSH, OF STARK COUNTY, ILLINOIS.

Letters Patent No. 67,387, dated July 30, 1867.

---

IMPROVEMENT IN HARROWS.

---

The Schedule referred to in these Letters Patent and making part of the same.

---

Be it known that I, JAMES WALSH, of the county of Stark, and State of Illinois, have invented a new and useful Improvement in Harrows; and I do hereby declare that the following is a full, clear, and exact description of the construction and operation of the same, reference being had to the annexed drawings, making a part of this specification, in which—

Figure 1:
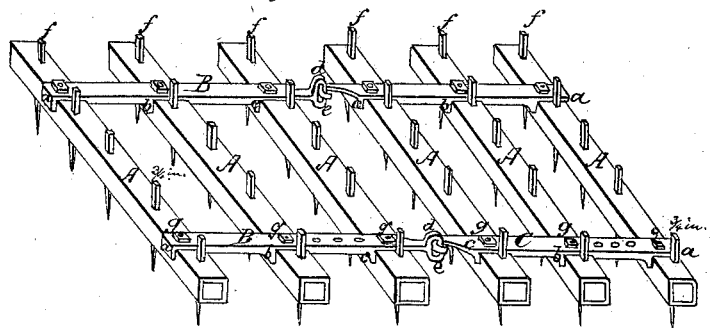

Figure 1 is a "perspective" view.

Figure 2, a "plan."

Figure 3:
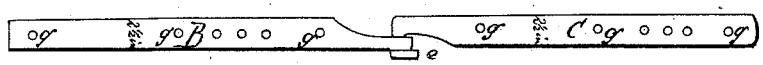
Figure 4:
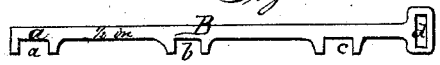

Figures 3 and 4 diagram of "straps" showing the hinge.

Figure 2:
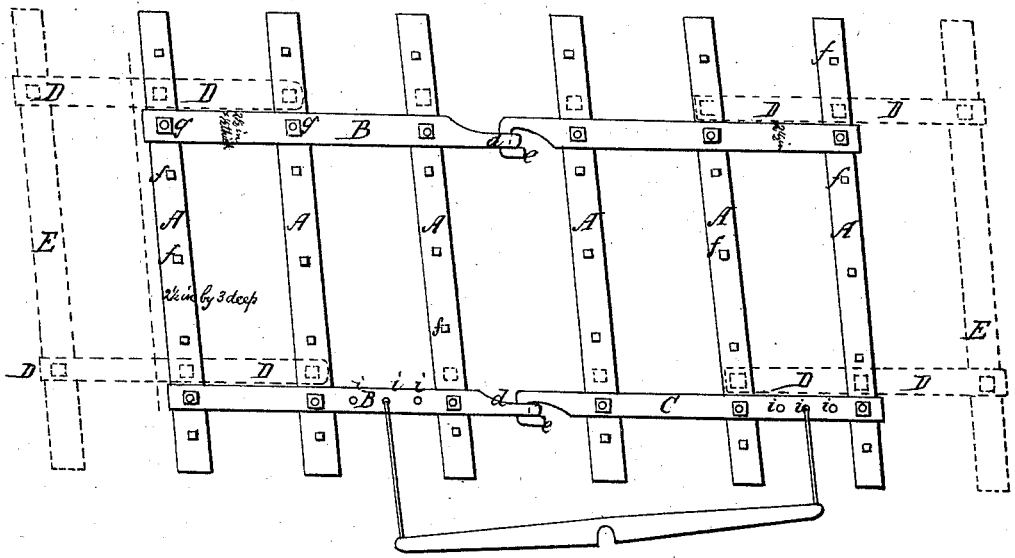

This harrow is constructed in halves, and of three parallel timbers A A A to each half. The timbers are connected by straps of iron B B C C, say about two and a half inches wide by one-half inch thick, running over each timber. Those straps C C on the left harrow terminate at the ends next to the opposite pair of straps in hooks $e\ e$, which are inserted in corresponding "eyes" $d\ d$ in the latter straps. The openings of "eyes" are, say, four inches long by about one and a half inch wide, just large enough to admit the hooks $e\ e$ on the opposite half of harrow, which is done by raising the left half of harrow to a perpendicular position, the hooks then readily entering the eyes; thus making, when the half harrow is again allowed to lie horizontally in its "working" position, a complete lock-hinge or joint. This harrow is intended for two horses, and can be enlarged at pleasure for three horses by the attachment of additional timbers (with their teeth) to the outer side of each half of harrow, hereinafter described. The straps B B and C C have each three jaws $a\ b\ c$ on their under side, at regular distances, to admit the timbers or "butts" containing the teeth, (see diagram figs. 3 and 4,) and are fastened by bolts and nuts $g\ g\ g$ to the timbers A A A, through holes at each of the jaws. The jaws should be about one and a half inch deep, thus giving a firm hold on the timbers. The front straps B and C are each pierced with three holes in order to regulate the draught of harrow or course of teeth through the soil. The harrow when wanted for three horses is extended on each of the sides, as above mentioned, by iron straps D D, of the same width and thickness as those on the main frame, provided with similar jaws and bolts, and carrying one timber, E, with necessary teeth, and run across the two outer timbers of harrow, as represented by the dotted lines in fig. 2. The whole of the above straps I make of cast malleable iron. The direction of the draught of the harrow is regulated by the changing of the hook of the draught in the holes $i\ i\ i$, thus giving a more or less diagonal motion to the harrow, as required.

The advantages of this improvement consist in the combination of the ordinary strap, hinge, and draw-bar into one piece of iron, rendering the harrow as thus constructed a more substantial and solid one, and of fewer parts, and less liable to get out of order, and easily repaired. The hinge, from its simplicity, and being easily cast with the strap, making a perfect lock when the harrow is lying horizontally, is a more secure and substantial fastening. By this plan, on a timber becoming injured it can be readily removed by extracting two bolts. The attachment of draught directly to the straps is economical on account of doing away with extra strap-bar of the ordinary harrow. The whole makes a cheaper, stronger, and more durable harrow than any now in use.

What I claim as my invention, and desire to secure by Letters Patent, is—

The straps of iron B B and C C, with their "hooks" $e$, and "eyes" $d$, or hinges, and arranged in pairs, the jaws $a\ b\ c$ on their under sides, also the "regulating" holes $i\ i\ i$, also the "attachment" or "extension-straps D D" for carrying additional "timbers" E E, all for the purposes described, and combined in the manner above stated.

JAMES WALSH.

Witnesses:
  EDMUND THURLOW,
  N. P. BAKER.